US 8,738,846 B2

(12) United States Patent
Son et al.

(10) Patent No.: US 8,738,846 B2
(45) Date of Patent: May 27, 2014

(54) FILE SYSTEM-AWARE SOLID-STATE STORAGE MANAGEMENT SYSTEM

(75) Inventors: Kyquang Son, Dublin, CA (US);
Ronald Lee, Pleasanton, CA (US);
Henry C. Lau, Fremont, CA (US);
Rajesh Ananthanarayanan, San Jose, CA (US)

(73) Assignee: Arkologic Limited, Fremont, CA (US)

( * ) Notice: Subject to any disclaimer, the term of this patent is extended or adjusted under 35 U.S.C. 154(b) by 225 days.

(21) Appl. No.: 13/274,277

(22) Filed: Oct. 14, 2011

(65) Prior Publication Data

US 2012/0096217 A1 Apr. 19, 2012

Related U.S. Application Data

(60) Provisional application No. 61/393,763, filed on Oct. 15, 2010.

(51) Int. Cl.
*G06F 12/02* (2006.01)

(52) U.S. Cl.
USPC .............. 711/103; 711/E12.008; 711/203; 711/159; 711/156

(58) Field of Classification Search
CPC ............... G06F 12/0246; G06F 2212/7201
USPC ................... 707/813; 711/103, E12.008
See application file for complete search history.

(56) References Cited

U.S. PATENT DOCUMENTS

| 7,802,054 | B2 | 9/2010 | Park et al. | |
|---|---|---|---|---|
| 2006/0136676 | A1 | 6/2006 | Park et al. | |
| 2010/0125702 | A1 | 5/2010 | Lee et al. | |
| 2010/0174853 | A1 | 7/2010 | Lee et al. | |
| 2010/0235329 | A1* | 9/2010 | Koren et al. | 707/687 |
| 2010/0235473 | A1* | 9/2010 | Koren et al. | 709/219 |
| 2010/0246266 | A1 | 9/2010 | Park et al. | |
| 2011/0055455 | A1* | 3/2011 | Post et al. | 711/103 |
| 2011/0055458 | A1* | 3/2011 | Kuehne | 711/103 |
| 2011/0283049 | A1* | 11/2011 | Kang et al. | 711/103 |

OTHER PUBLICATIONS

International Search Report and Written Opinion dated Jun. 29, 2012 for International Application No. PCT/US2011/056477, 13 pages.

* cited by examiner

*Primary Examiner* — Reginald Bragdon
*Assistant Examiner* — Mehdi Namazi
(74) *Attorney, Agent, or Firm* — Perkins Coie LLP

(57) ABSTRACT

A file system-aware SSD management system including an SSD management module that incorporates both file system information and information related to the underlying physical solid-state storage media into its operations is described. Also described are related methods for performing data management operations in a file system-aware manner. By incorporating both file system and physical storage information, the system may achieve various advantages over conventional systems, such as enhanced I/O performance, simplified SSD firmware, and extended SSD lifespan. Moreover, by moving solid-state management functions above the firmware level, the system may enable the simultaneous management of a pool of multiple SSDs.

45 Claims, 10 Drawing Sheets

Page Status Table 300

| | Page ID 310a | Logical Write Position 310b | Page Status 310c |
|---|---|---|---|
| 305a | 0 | Start | Valid |
| 305b | 1 | Middle | Valid |
| 305c | 2 | End | Valid |
| 305d | 3 | Start | Invalid |
| | ... | ... | ... |

*FIG. 3A*

Mapping Table 330

| | FLBA ID 320a | DATA TYPE 320b | SUPERBLOCK ADDRESS 320c | SUPERPAGE ADDRESS 320d | PAGE ADDRESS 320e | SECTOR ADDRESS 320f |
|---|---|---|---|---|---|---|
| 315a | 0 | Metadata | 67 | 220 | 5 | 3 |
| 315b | 1 | User data | 514 | 32 | 7 | 1 |
| | ... | ... | ... | ... | ... | ... |

*FIG. 3B*

Superblock Table 350

| | Super Block ID 335a | Wear Count 335b | # Valid Pages 335c | # Invalid Pages 335d | State 335e | Next Superpage 335f | Next Page 335g | Page Detail 335h | Last Mod. Time 335j | Data Type 335k |
|---|---|---|---|---|---|---|---|---|---|---|
| 340a | 0 | 115 | 0 | 0 | CLEAN | 0 | 0 | Pagelist$_1$[ ] | 5/5/11 09:11:01 | Metadata |
| 340b | 1 | 462 | 856 | 741 | IN_USE | 68 | 5 | Pagelist$_2$[ ] | 1/1/09 22:08:11 | User Data |
| ... | ... | ... | ... | ... | ... | ... | ... | ... | ... | ... |

FIG. 3C

Page Detail Array 375

| | Super Block ID 385b | Super Page ID 385c | Page ID 385a | FLBA Address 385d |
|---|---|---|---|---|
| 380a | 522 | 16 | 0 | 98287 |
| 380b | 522 | 16 | 1 | 98303 |
| ... | ... | ... | ... | ... |

FIG. 3D

FILE SYSTEM-AWARE SOLID-STATE STORAGE MANAGEMENT SYSTEM

CROSS-REFERENCE TO RELATED APPLICATION

The present application claims priority to and the benefit of U.S. provisional application No. 61/393,763, filed Oct. 15, 2010, and titled "FLASH AWARE FILE SYSTEM (FAFS) UTILIZING FLASH OPTIMIZED RAID TECHNIQUES," which is hereby incorporated herein in its entirety.

BACKGROUND

Solid-state drives (herein "SSDs") store data persistently in solid-state memory such as NAND flash memory. SSDs offer advantages over traditional hard disk drives, such as improved resistance to mechanical shock, lower power consumption, and faster access times. SSDs have a different set of operating constraints than hard disk drives. As a first example, SSDs can be programmed with high granularity (e.g., at the byte or word level), but must be erased with far less granularity (e.g., at the block level). As a second example, SSDs typically require that a write operation span physically sequential flash pages. As a third example, SSDs have a much longer erase time than read times or write times. As a fourth example, each block in an SSD can only endure a finite number of erase cycles.

BRIEF DESCRIPTION OF THE DRAWINGS

FIGS. 3A through 3D are tables illustrating the management data structures maintained by an SSD management module.

DETAILED DESCRIPTION

The inventors have discovered that most file systems, which were originally designed for magnetic storage media such as hard disk drives, fail to accommodate the unique operating constraints of SSDs. For example, many file systems perform read/write operations to an SSD in the same fashion as read/write operations to a hard disk drive. File systems typically rely on lower-level hardware and firmware embedded in the SSD to implement input/output ("I/O") operations in a manner suitable for the underlying physical configuration of the SSD.

Moreover, the inventors have discovered that the failure of conventional SSDs to incorporate file system information into their operational logic often results in inefficiencies. For example, a conventional SSD typically has an embedded controller and firmware that are responsible for performing address remapping, garbage collection, wear leveling, and other data management operations. However the embedded controller and firmware typically do not utilize file system information during these data management operations. For example, embedded controllers typically do not customize data management operations to the type of data implicated by the operation (e.g., metadata versus user data). As another example, typically during wear-leveling and garbage collection, embedded controllers do not physically group together data that is logically contiguous within the overlying file system.

In response to these discoveries and other shortcomings of conventional systems, the inventors have developed a file system-aware SSD management system ("the system") including an SSD management module ("the SSD module") that incorporates both file system information and information related to the underlying physical solid-state storage media into its operations. By incorporating both file system and physical storage information, the system may achieve various advantages over conventional systems, such as enhanced I/O performance, simplified SSD firmware, and extended SSD lifespan. Moreover, by moving solid-state management functions above the firmware level, the system may enable the simultaneous management of a pool of multiple SSDs.

File System-Aware SSD Management System

Figure 1:
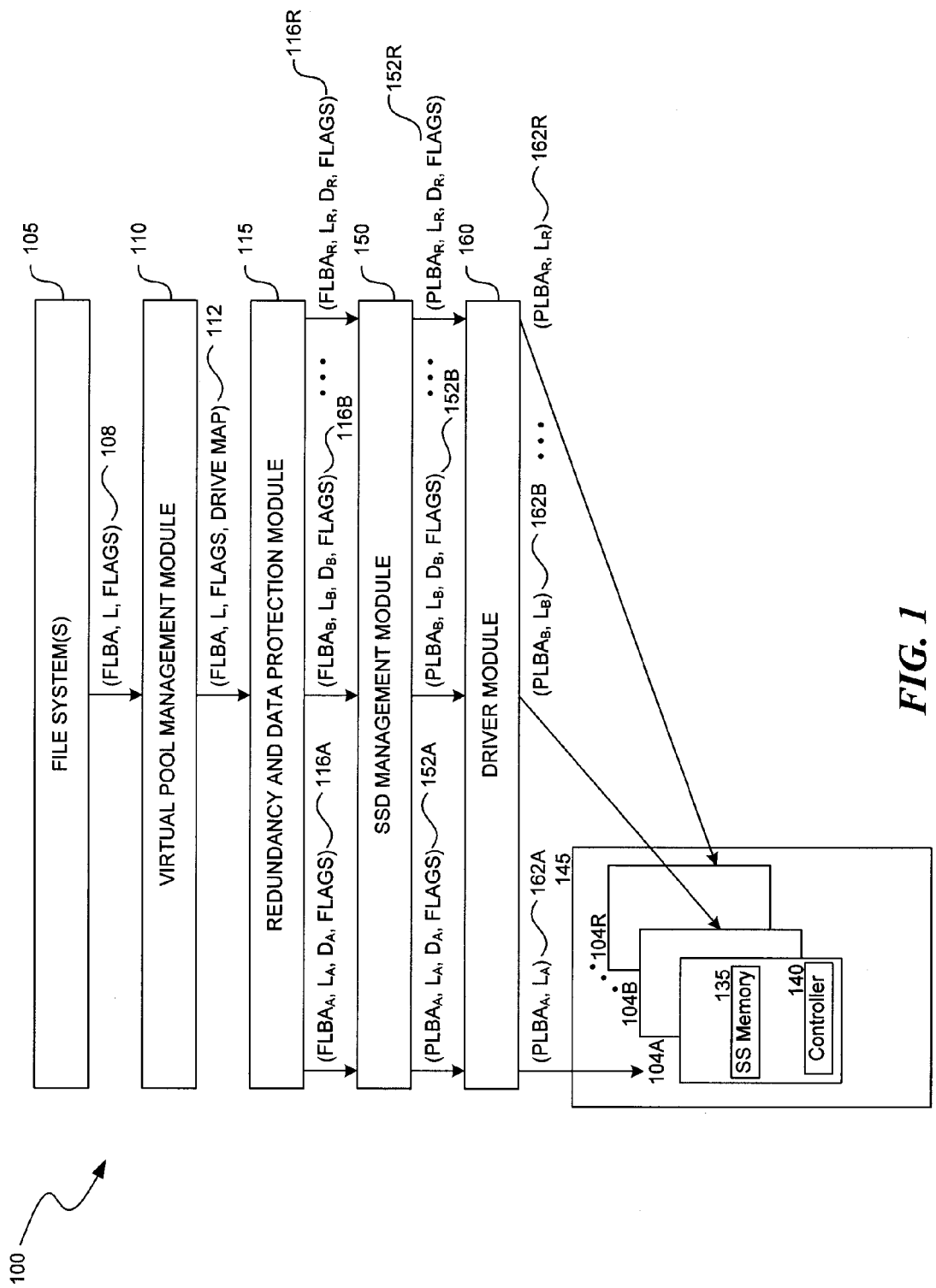
FIG. 1 is a block diagram illustrating a file system-aware SSD management system.

FIG. 1 shows a file system-aware SSD management system ("the system") 100. The system includes one or more file systems 105, a virtual pool management module 110, a redundancy and data protection module 115, an SSD management module ("the SSD module") 150, a driver module 160, and an SSD array 145.

The SSD array includes one or more SSDs 104. Each SSD includes persistent solid-state memory 135 and a controller 140 that is configured to execute firmware (not shown) to store, retrieve and erase data. In some embodiments, the controller and firmware are configured differently from many conventional systems in that they do not perform onboard garbage collection or wear-leveling, but rely upon the SSD module to manage such operation, as described in greater detail herein. In various embodiments the SSDs in the SSD array are configured as a Redundant Array of Independent Disks ("RAID") group, data mirror, or other type of drive array configuration that provides data redundancy and protection. Although only a single SSD array is shown, in some embodiments the same SSD module manages multiple SSD arrays. Unless the context requires otherwise, subsequent references to "the controller" should be understood to encompass both the controller and the firmware executed by the controller. As used herein, "solid-state memory" encompasses, as non-exhaustive examples, flash memory, magnetoresistive random access memory ("MRAM"), phase-change memory (i.e., PCM, PRAM, PCRAM, Ovonic Unified Memory, Chalcogenide RAM, or C-RAM), ferroelectric random access memory ("FeRAM" or "FRAM"), conductive-bridging RAM or programmable metallization cell memory, Silicon-Oxide-Nitride-Oxide-Silicon ("SONOS") memory, resistive random access memory ("RRAM"), Racetrack Memory, Nano-RAM ("NRAM"), Millipede memory, dynamic random access memory ("DRAM"), static random access memory ("SRAM"), thyristor random access memory ("T-RAM"), zero capacitor random access memory ("Z-RAM"), and twin transistor random access memory ("TTRAM").

Each file system allocates persistent memory, tracks persistent memory usage, and otherwise manages the persistent memory of data storage devices, including the SSD array. As part of its function, the file system logically organizes user data (e.g., data files) and metadata by associating file system logical block addresses ("FLBAs") with each of the blocks (or other units) of user data and metadata under its management. As used herein, the term metadata encompasses any data, other than user data, that facilitates the file system's organization of, access to, or other management of user data. Non-exhaustive examples of metadata include directory information, file types, creation/access/modification times, and access control information. The file system also tracks free persistent memory space that is available, e.g., for new files and metadata. Non-exhaustive examples of file systems include Unix-based file systems (e.g., UFS, FFS), Linux-based file systems (e.g., XFS, JFS, ReiserFS, btrfs), Solaris-based file systems (e.g., VxFS, QFS, ZFS), Windows-based file systems (e.g., FAT, NTFS) and Mac OS-based file systems (e.g., HFS Plus).

The virtual pool management module abstracts or obscures the physical structure underlying the SSD array and presents the SSD array as a single pooled storage resource to the file system. As non-exhaustive examples, the virtual pool management module may be a volume manager or a Pooled Storage Layer of a ZFS file system. As a result of the abstraction, the higher-level file system responsible for logically organizing files and metadata may be unaware of the constituent physical SSDs that form the SSD array. Instead, the file system may view the SSD array as a monolithic virtual device or virtual data pool having an aggregate capacity. For a variety of reasons, including that the underlying physical structure of the SSD array is hidden from the file system, the FLBA used by the file system to address a particular block of user data or metadata typically does not correspond to the physical logical block address ("PLBA") where the user data or metadata is physically stored within an SSD.

The redundancy and data protection module intercepts I/O requests originating from the file system and modifies those I/O requests in order to implement data redundancy or other data protection schemes such as RAID or data mirroring schemes. The redundancy and data protection module may also compile various data blocks received from different SSDs in response to a file system I/O request. For example, in some embodiments that include a ZFS file system, the redundancy and data protection module may implement RAIDZ schemes. Other embodiments may implement mirrored disks or any other RAID scheme, including standard and non-standard RAID levels.

The SSD module intercepts I/O requests originating from the file system, which may have been modified by the intervening virtual pool management and redundancy and data protection modules. As described in greater detail herein, the SSD module incorporates both file system information and information related to the underlying physical solid-state storage media in order to perform actions that fulfill those I/O requests. Additionally as described further herein, the SSD module performs various housekeeping operations to help improve the performance of the SSD array, such as wear-leveling, garbage collection, and table recovery operations.

The driver module includes one or more device drivers capable of facilitating communications between the file system (and intervening modules) and the SSDs. For example, the driver module may translate I/O requests received from the SSD module into a device-specific format suitable for a particular SSD. The device driver may then send the translated I/O request to the SSD over a communications interface (not shown), such as a bus or network connection.

To illustrate the type of interactions that occur between the system components, FIG. 1 also shows a highly simplified communication flow for a file system write request. As shown at 108, the write request originates with the file system sending the write request to the virtual pool management module. The write request indicates the FLBA associated with the write operation, a logical length for the write operation ("L", e.g., the number of sectors to be written), source data to be written (not shown), and various I/O flags. As one non-exhaustive example, the I/O flags may indicate whether the source data is user data, metadata, or raw data.

As shown at 112, the virtual pool management module augments or modifies the request so that it includes information about the constituent physical SSD drives that underlie the SSD array storage pool (e.g., "drive map information") and provides the augmented request to the redundancy and data protection module. Alternatively, the redundancy and data protection module may obtain the write request and drive map information by other means. As shown at 116A-R, the redundancy and data protection module uses the received request and drive map information to generate one or more subsidiary write requests, each directed to a different SSD in the SSD array. The various subsidiary requests are generated in accordance with an applicable redundancy or data protection scheme. For example, if the SSD array is implemented as an eight-member RAID-6 array, the redundancy and data protection module may split the write request into six smaller write requests that each include a portion of the source data, and two write requests that each include parity data. Each subsidiary data request may include an FLBA, length, drive identifier ("D") and I/O flags.

As shown at 152A-R, the SSD module translates the FLBA of each subsidiary request into a corresponding PLBA as described in greater detail herein. For each subsidiary request the SSD module then provides to the driver module the PLBA, length, drive identifier, and a portion of the source data (or parity data). As shown at 162A-R, the driver module translates each subsidiary request into a device-specific format and conveys each translated request to the identified constituent SSD in the SSD array. In response to receiving a subsidiary request, an SSD stores the source or parity data in accordance with the received request at the physical locations that correspond to the indicated PLBAs.

Items 108, 112, 116, 152, and 162 are intended to provide only an illustrative example of a subset of the communications that might occur in the system during a write operation. In some embodiments, additional and/or different communications occur during a write operation. Moreover, the system is capable of fulfilling other types of I/O requests such as read operations, as described in further detail herein.

SSD Array Organization

Figure 2:
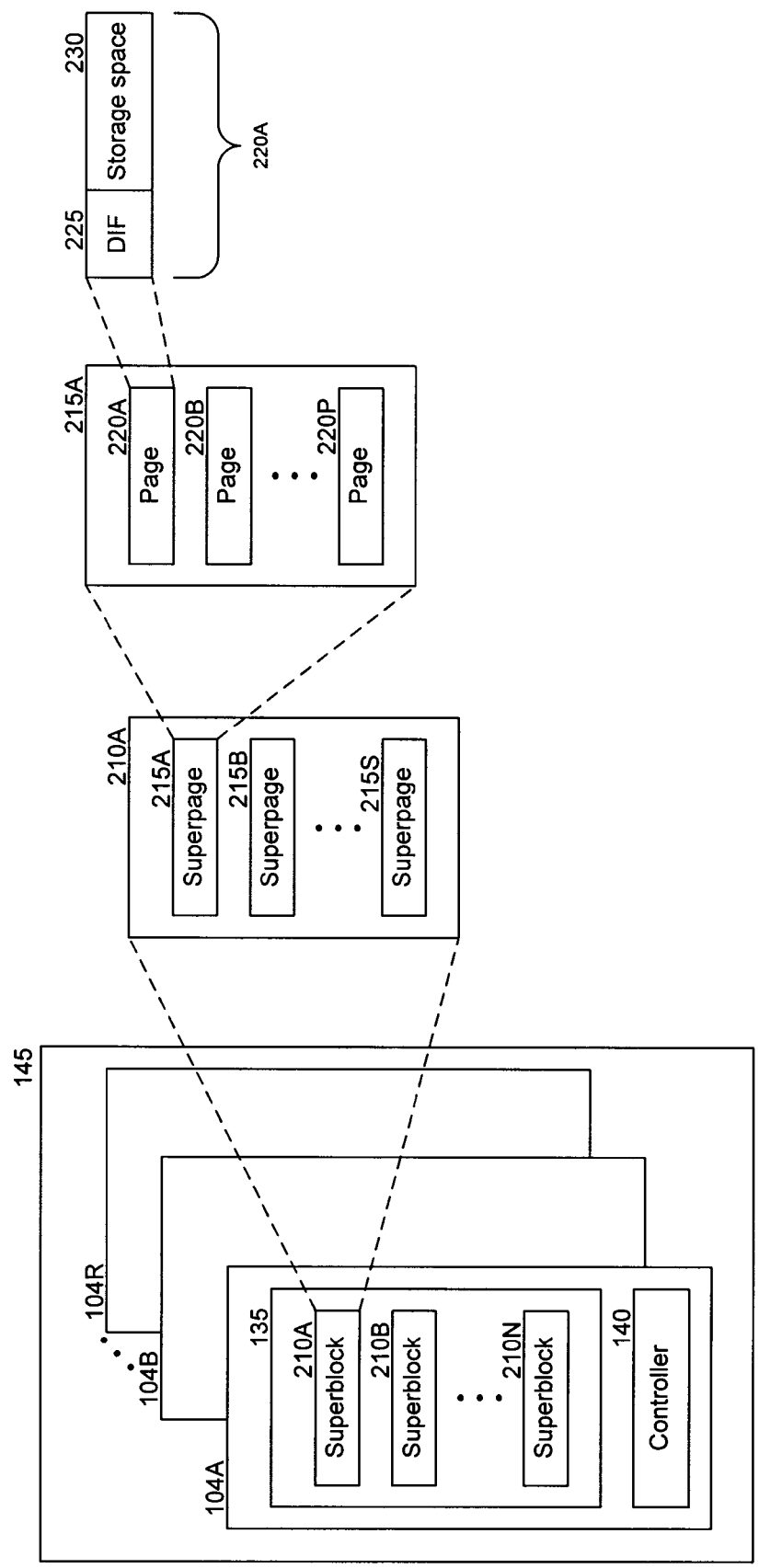
FIG. 2 is a block diagram illustrating the hierarchical organization of an SSD array.

FIG. 2 illustrates the hierarchical organization of an SSD array. As shown, the solid-state memory 135 of each SSD in the SSD array comprises one or more superblocks 210, each of which in turn comprises one or more superpages 215, each of which in turn comprises one or more pages 220. In some embodiments, an SSD has a capacity of approximately 512 GB, a superblock stores approximately 16 MB of data, a superpage stores approximately 64 KB of data, and a page stores approximately 8 KB of data.

Each superblock is a grouping of one or more flash blocks that the controller associates with a unique superblock address; the constituent flash blocks in a superblock are typically physically contiguous. Typically, the controller permits erasures (or "flashes") to occur only at the superblock-level, and does not permit erasures at the level of a superblock's constituent individual physical flash blocks. Each superblock is a physically contiguous grouping of one or more flash pages that the controller associates with a unique combination of a superblock address and a superpage address. Each page is a physically contiguous collection of memory cells in the solid-state memory that the controller associates with a unique combination of a superblock address, a superpage address, and a page address. Typically, the controller permits programming to occur only at the page-level. The controller typically does not permit random-access programming at the level of a page's constituent memory cells.

Generally speaking, within a particular superblock, the controller will implement only sequential write operations. In other words, the controller will spread the first write operation to a superblock along the first set of contiguous pages in a first superpage and begin the next, second write operation to the same superblock at the next contiguous page in the first superpage. Once the first superpage in the superblock is full, during the next write operation to the same superblock, the controller will write data to the first page in the next physically contiguous superpage.

As shown in FIG. 2, each page includes storage space 230 and a data integrity field ("DIF") header region 225. The storage space 230 is a collection of memory cells (e.g., 8 KB) within the page used to store user data, metadata, or raw data (e.g., data structures utilized by the SSD module as described in greater detail herein). The DIF header region is a smaller collection of memory cells (e.g., 16 bytes) that are conventionally used to store data integrity information. For example, the DIF header region may be used to store checksums or similar information that permits the controller to determine whether the data in the storage space is corrupt. In some embodiments, the SSD controller accepts at least two kinds of write requests: (1) a "with DIF" write request to write both source data (e.g., user, metadata, or raw) into the storage space and to write other data (e.g., restoration data) to a portion of the DIF header, and (2) a "without DIF" write request to only write source data into the storage space. Similarly, in some embodiments, the SSD controller accepts at least two kinds of read requests: (1) a "with DIF" read request to read both source data (e.g., user, metadata, or raw) from the storage space and to read other data (e.g., restoration data) from a portion of the DIF header, and (2) a "without DIF" read request to only read source data from the storage space.

SSD Management Data Structures

FIGS. 3A through 3D illustrate management data structures maintained by an SSD module to facilitate its various functions. In some embodiments, the SSD module maintains a separate instance of each data structure for each SSD within the SSD array. In other embodiments, the SSD module may maintain only a single instance of each data structure that is used for all the SSDs in the SSD array.

The SSD module may store some or all of the data structures shown in FIGS. 3A-3D related to a particular SSD in persistent storage such as the same SSD, a different SSD in the SSD array, and/or non-volatile RAM. In some embodiments, the SSD module backs up an instance of a data structure related to a first SSD in a different, second SSD, to ensure that the data structure is recoverable in the event that a portion of the memory in the first SSD becomes corrupted. Additionally, the SSD module may manipulate the values in a data structure by reading a portion of the data structure into system memory (not shown), e.g., using a page in, page out approach.

FIG. 3A illustrates a page status table 300, which the SSD module may utilize to quickly identify the status of any page in an SSD. As shown, the table includes a separate row for each page in the SSD. The table associates each page (column 310a) with a logical write position (column 310b) and a page status (column 310c). The logical write position for a page indicates the relative position of the page within a larger logical write operation requested by the file system or another component. The logical write position column may indicate whether a particular page is the first or starting page of a logical write as shown in row 305a, the last or end page of a logical write as shown in row 305c, or a middle page that falls between a start page and end page, as shown at row 305b. To illustrate, if the file system makes a single logical write request to store a quantity of user data that spans five pages, the first physical page written during the fulfillment of the request is marked "Start," the next three contiguous physical pages are marked "Middle," and the fifth contiguous physical page is marked "End." By maintaining logical write position information for each page, the SSD module can more readily identify a group of physical pages that store data for a contiguous set of FLBAs.

The page status column indicates whether the data stored in a particular physical page is free, valid, or invalid. A physical page is "free" if the page has not been programmed with data since its superblock was last erased. The data in a physical page is "valid" if it represents up-to-date data that is in use by the file system or another system component, such as the SSD module. A physical page is "invalid" if the data it contains is stale, either because the file system or another component is no longer using the data stored in the physical page (e.g., because a file was deleted from the file system) or because an updated version of the stored data was stored in a different physical page (e.g., during a re-write operation). Further illustrative examples of how data becomes invalid are described in greater detail herein.

While FIG. 3A and each of the table diagrams discussed below show a table whose contents and organization are designed to make them more comprehensible by a human reader, those skilled in the art will appreciate that actual data structures used by the module to store this information may differ from the table shown, in that they, for example, may be organized in a different manner; may contain more or less information than shown; may be compressed and/or encrypted; etc. In some embodiments, the page status table shown in FIG. 3A is organized as a bitmap.

FIG. 3B illustrates an FLBA to PLBA mapping table (or "mapping table") 330. As shown, the mapping table includes a separate row for each FLBA used by the file system, the virtual pool management module, the redundancy and data protection module, and/or the SSD module. The mapping table associates each FLBA (column 320a) with a data type (column 320b), superblock address (column 320c), a superpage address (column 320d), a page address (column 320e), and a sector address (column 320f). Herein, the term "PLBA" refers to the combination of the various values in columns 320b-320f. The data type column indicates whether the file system or another component associates a particular FLBA with metadata, user data, or raw data, i.e., data used by the SSD module to store SSD management data, such as those data structures illustrated by FIGS. 3A through 3D. As described previously with respect to FIG. 2, the unique combination of a superblock address, a superpage address, and a page address (in columns 320c-e) permits the controller to address a single physical page within the SSD that stores the user data, metadata, or raw data associated with the FLBA. The sector address column indicates which physical portion or offset within a particular page stores the data associated with an FLBA. If the file system has not yet allocated a particular FLBA to store user data or metadata, but is instead maintaining the FLBA within its free storage pool, the mapping table may indicate that currently the particular FLBA is yet not mapped to a PLBA and/or the mapping table may not include an entry for that particular FLBA. In some embodiments, the mapping table shown in FIG. 3B is organized as a hash table that is divided into several regions, where an FLBA is used as the lookup. The hash table may also include header information to identify a device name, unique identifiers, sizes of the different regions in the hash table, and memory addresses for different regions.

FIG. 3C illustrates a superblock table 350. As shown, the superblock table includes a separate row for each superblock in an SSD. The superblock table associates each superblock (column 335a) with a wear count (column 335b), a valid page count (column 335c), an invalid page count (column 335d), a state (column 335e), a next superpage indicator (column 335f), a next page indicator (column 335g), a page detail array (column 335h), a last modification time (column 335j), and a data type (column 335k). The wear count column indicates how many times a particular superblock has been erased. For example row 340a indicates that superblock 0 has been erased 115 times. The valid page count column and invalid page count column indicate how many pages within the superblock are valid and invalid, respectively. For example row 340b indicates that superblock 1 has 856 valid pages and 741 invalid pages.

The state column indicates the current state of each superblock. For example, as shown at row 340a, the state column indicates that superblock 0 is "CLEAN," meaning the superblock has been erased and is available to take new writes. As another example, as shown at row 340b, the state column indicates that superblock 1 is "IN_USE" because there are pages within the superblock that are available for new writes. Other non-exhaustive examples of possible superblock states include "SEALED," indicating that there are no free pages within the superblock because all pages have been written, "GC," indicating that garbage collection is currently in progress within the superblock, and "WL" indicating that wear leveling is currently in progress within the superblock. Of course other superblock states are possible.

Together, the next superpage column and next page column identify the physical location of the next page that should be written to within the superblock to ensure that the SSD controller is writing new data to sequential pages. For example as shown at row 340b, within superblock 1, the controller has already written data to all pages in superpages 0-67 and pages 0-4 in superpage 68, and the next write to superblock 1 should occur at page 5 within superpage 68.

The last modification time indicates approximately the most recent time that any page within the superblock was invalidated or programmed. The data type column indicates the type of data that is stored within the superblock, such as user data, metadata, and raw data.

FIG. 3D illustrates a page detail array 375 that the superblock table may associate with a particular superblock in the page detail array column 335 of the superblock table. As shown, the page detail array includes a separate row for some or all pages within a superblock. The page detail array associates each page (column 385a) with a superblock identifier (column 385b) and superpage identifier (column 385c) that together indicate where the page is physically located in the SSD. The page detail array also associates each page with an FLBA address (column 385d). To reduce memory requirements, in some examples, a page detail array is only maintained for pages in the subset of superblocks that the SSD module is actively accessing or otherwise using, e.g., for file system operations, uberblock updates, garbage collection, or wear-leveling.

Write Operation

Figure 4:
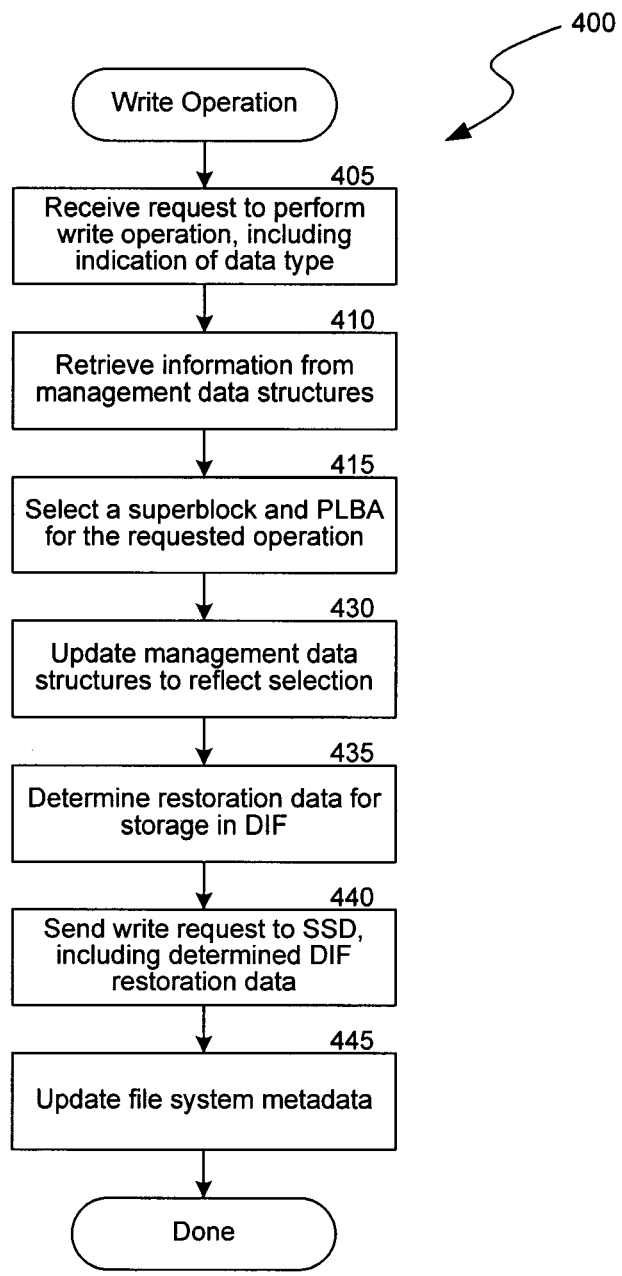
FIG. 4 is a flowchart illustrating a process for a write operation.

FIG. 4 is a flowchart illustrating a process 400 for a write operation. The write operation process begins at block 405, where the SSD module receives a request to perform an operation to write source data to an SSD. The request may be received from the file system or another system module. The received request includes an indication of an FLBA associated with the source data, as well as an indication of the size of the write request (e.g., the number of sectors to be written), as well as an indication of the data type of the source data (e.g., metadata, user data, or raw data). In some examples, a write operation is initiated from the SSD module itself, not in response to an explicit request to perform a write operation. For example, the SSD module may initiate a write operation as part of an SSD maintenance operation (e.g., garbage collection or wear leveling) or in order to store a portion of a management data structure (i.e., raw data) in the SSD. In such examples, the SSD module may determine the FLBA, the size of the write request, and the data type of the source data.

At block 410, the SSD module retrieves information from management data structures, such as those illustrated by FIGS. 3A-D. For example, the module may access the superblock table associated with the SSD to identify which superblocks in the SSD are currently in use or clean and therefore available as candidate superblocks to store the source data. In the examples where the write operation will write new data to an existing file, metadata block, or management data structure (a "rewrite operation"), the received FLBA may already be associated with a particular PLBA. Therefore, the SSD module may also look up the received FLBA in the mapping table to determine whether the FLBA is already associated with a previously-stored PLBA.

At block 415, the SSD module selects a superblock and PLBA to store the source data in order to fulfill the requested operation. When selecting the superblock, the SSD module may evaluate any combination of several factors including, as non-exhaustive examples: the volume of source data to be written, the number of free, valid and/or invalid pages in each candidate superblock, the state of each candidate superblock, the data type of the source data, the data type of data already stored in each candidate superblock, the wear count and/or last modification time of each candidate superblock, the superblock associated with a previously-stored PLBA, the physical configuration or layout of the solid-state memory in the SSD. Other examples of factors include other recent, in-progress, or pending I/O requests received before, during, or after the current write request was received. In the case of a rewrite, the SSD module may also evaluate the previously-stored PLBA. The SSD module may determine some or all of these various factors by accessing and analyzing the various management data structures described previously and/or by querying the file system or the controller.

As a first example, at block 415, the SSD module may eliminate from consideration any candidate superblocks having an insufficient number of free pages available to hold all of the source data. As a second example, the SSD module may give preference to candidate superblocks that are currently storing data of the same data type as the source data. To illustrate, if the source data is metadata, the SSD module may remove from consideration any candidate superblocks that are already storing user data or raw data, so that similar data is grouped by superblock within the SSD. As a third example, the SSD module may give preference to candidate superblocks having lower wear counts as compared to other candidate superblocks. As a fourth example, the SSD module may determine which candidate superblocks would offer superior I/O performance (e.g., a faster write time) as compared to other superblocks. To illustrate, the SSD module may remove from consideration any candidate superblocks that are being used to fulfill another in-progress or pending I/O request. To illustrate further, the SSD module may also evaluate whether the physical layout (e.g., geometry) of the solid-state memory results in a particular candidate superblock offering a faster write time than other superblocks.

After the SSD module selects a superblock, the SSD module accesses the next superpage and next page address information associated with the selected superblock in the superblock table. By combining the accessed information, the address of the selected superblock, and the data type of the source data, the SSD module determines the complete selected PLBA for the write operation.

At block 430, the SSD module updates management data structures to reflect the selection made at block 415. The SSD module updates the mapping table in order to associate the FLBA with the newly selected PLBA. The SSD module also updates the page status table to indicate that the page associated with the selected PLBA is valid and is the start of a logical write operation (or if the logical write operation spans only a single page, the SSD module may alternatively indicate that the page is the end of a logical write operation). As another example, the SSD module may update the state, valid page count, invalid page count, next super page, next page, last modification time, and/or page detail array associated with the selected superblock in the superblock table to reflect that the page associated with the PLBA will be written with valid data.

During a rewrite operation, the SSD module will also update various data structures to indicate that the page associated with the previously-stored PLBA is now invalid. For example, the SSD module updates the page status table so that the page associated with the previously-stored PLBA is marked as invalid. As another example, the SSD module updates the last modification time, valid page count, and invalid page count associated with the superblock corresponding to the previously-stored PLBA to reflect that the page associated with the previously-stored PLBA is now invalid.

Since a single logical write operation may span several sectors or pages (and therefore several FLBAs and PLBAs), the SSD module similarly updates other entries in the mapping table, superblock table, and the page status table to reflect the changes to all of the pages that are implicated by the write operation. For example, when the write operation spans several pages, in the page status table, the SSD module may associate each implicated page with a logical write position indicator that reflects the page's relative position within the logical write operation (e.g., as a middle page or end page).

At block 435 the SSD module determines restoration data to be stored in the DIF header region of the pages associated with the selected PLBA and sequential pages that will also be written. In some embodiments, for each page written, the restoration data includes at least the PLBA for the page, the FLBA for the page, a logical write position indicator for the page, and/or an I/O timestamp corresponding approximately to the time of the write request.

At block 440, the SSD module sends a write request (e.g., a "with DIF" write request, as described herein) to the SSD to write the source data (to the storage space) and DIF restoration data (to the DIF header regions) at the selected PLBA and the other sequential pages implicated by the write operation. The write request typically does not include any indication of the FLBA, other than the embedded indication of the FLBA in the DIF restoration data. Typically the controller does not use the embedded FLBA to perform addressing functions, but rather, merely stores the FLBA within a DIF header region.

At block 445, the SSD module updates file system metadata (such as creation or modification times), as needed, to reflect the successful write operation. The write operation process then ends.

Although not shown in FIG. 4, at a later time, an SSD module may receive a request to read data that was written during the write operation or may itself determine that it needs to access the data that was written during the write operation. For example, the SSD module may receive a request from the file system to read data from sectors associated with the same FLBA. As another example, during garbage collection or other maintenance operations, the SSD module may determine that it needs to read the data that was written during the write operation. In order perform a read operation, the SSD module may use a received or determined FLBA as the lookup into the mapping table in order to identify the corresponding PLBA for the read request. The SSD module may then send a read request, including the identified PLBA, to the SSD. In response, the SSD module may receive a copy of the data associated with that PLBA that it can then provide to the file system or otherwise utilize.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Delete Operation

Figure 5:
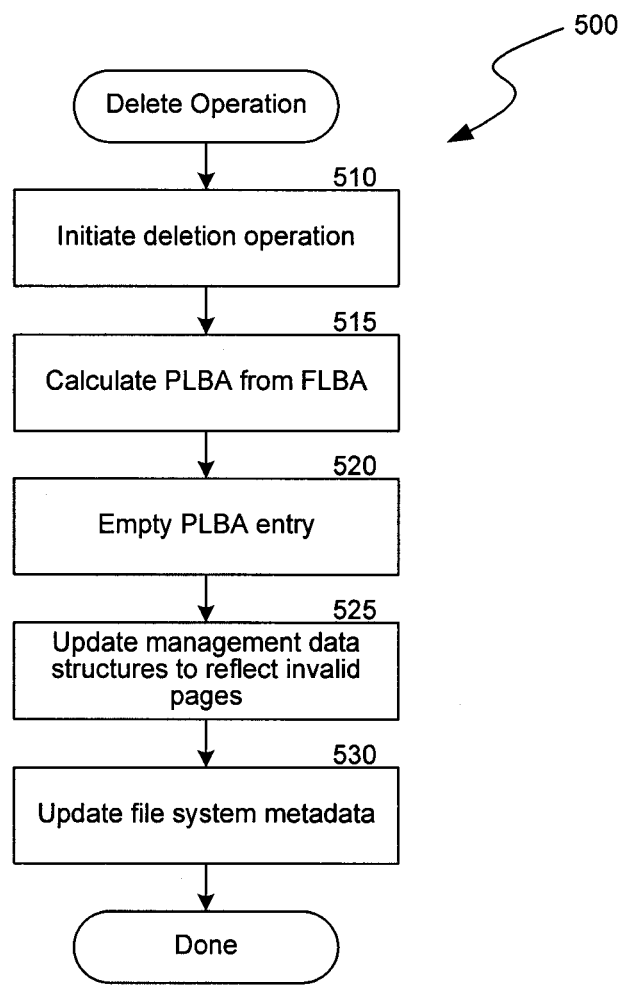
FIG. 5 is a flowchart illustrating a process for a delete operation.

FIG. 5 is a flowchart illustrating a process 500 for a delete operation. The deletion process begins at block 510 when the SSD module initiates the deletion operation in response to one or more triggers. As non-exhaustive examples, these triggers include the SSD module receiving an explicit command (such as a TRIM command) from the file system indicating that the file system is no longer storing data in association with a particular FLBA (e.g., when a file is deleted from the file system), by detecting a file system block release whereby the file system returns a particular FLBA to the file system's free storage pool, or if the SSD module chooses to delete raw data from the SSD.

At block 515, the SSD module calculates a PLBA from the FLBA, using the mapping table described herein. At block 520, the SSD module empties the PLBA entry associated with the FLBA or otherwise indicates in the mapping table that the FLBA is no longer associated with a PLBA. At block 525, the SSD module updates management data structures to reflect that the page associated with the PLBA is now invalid. For example, the SSD module updates the page status table to mark the page associated with the PLBA as invalid. As another example, the SSD module updates the last modification time, valid page count, and invalid page count associated with the superblock corresponding to the PLBA to reflect that the page associated with the PLBA is now invalid.

At block 530, the SSD module updates file system metadata as needed to reflect the deletion operation, and then the deletion process ends.

Garbage Collection and Wear Leveling

The SSD module performs various SSD maintenance operations including garbage collection and wear leveling, which can relieve the SSD controller and firmware of these responsibilities. Generally speaking, garbage collection is a process whereby the SSD module frees up invalid pages that store stale data that is no longer needed by the file system, in order to make those pages available for new write operations. Generally speaking, wear leveling is a process that helps ensure that the various superblocks in the SSD have similar wear counts. In some examples, the SSD module combines both a garbage collection process in conjunction with a wear leveling process (both described herein) into a single thread that may be triggered periodically, e.g., every 30 seconds, or upon the occurrence of another condition. Additionally, in some embodiments, to facilitate faster garbage collection and/or wear leveling processes, the SSD module maintains an over-provisioning pool of free superblocks (e.g., 128 superblocks) to use during maintenance operations. To further enhance maintenance performance, the SSD module may maintain, in its memory and/or the solid-state memory, several lists of superblocks that have (a) the highest wear counts (e.g., a list of 64 superblocks), (b) the lowest wear counts (e.g., a list of 64 superblocks), and/or (c) the highest number of invalid pages (e.g., a list of 64 superblocks), as well as management data related to the superblocks in these lists (as described with respect to FIGS. 3A-D).

Figure 6:
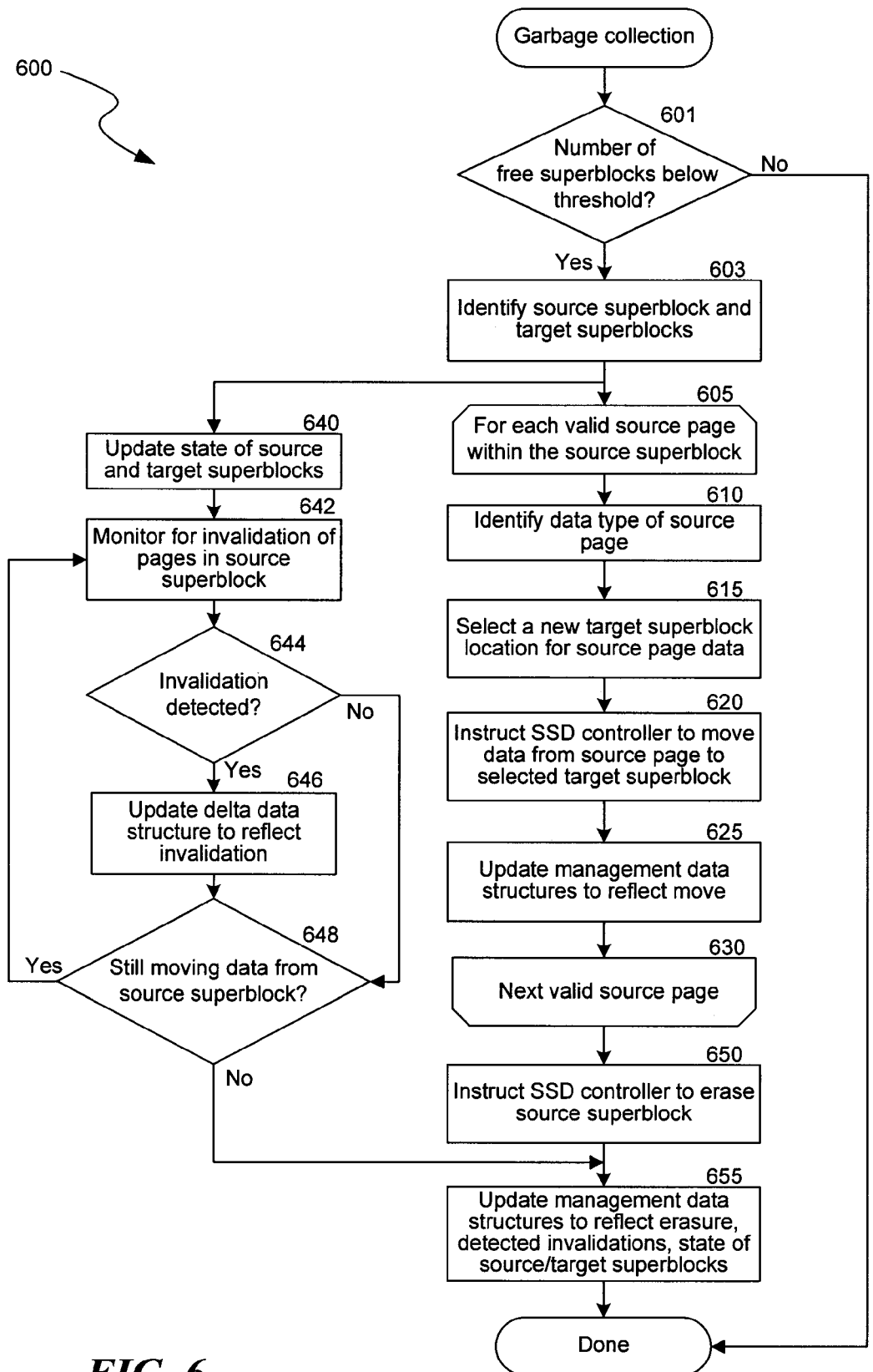
FIG. 6 is a flowchart illustrating a process for garbage collection.

FIG. 6 is a flowchart illustrating a process 600 for garbage collection. The garbage collection process begins at block 601 where the SSD module determines whether the number of free superblocks in the SSD falls below a predetermined threshold, which may be mandated, for example, by a user-controlled policy. For example, the SSD module may determine whether at least 20% (or another predetermined percentage) of all superblocks in the SSD have the state "FREE." If the number of free superblocks is higher than the predetermined threshold, the garbage collection process ends, otherwise the process proceeds to block 603. In some embodiments, the SSD module evaluates various other factors to determine whether to proceed to block 603, in addition to or in place of the number of free superblocks. As nonexhaustive examples, the SSD module may consider the frequency of I/O requests being made by the file system, the day and/or time of day, and explicit commands from the file system or a user to perform garbage collection. In some embodiments, the SSD module will proceed with the garbage collection process in conjunction with a wear-leveling process 700 described herein if either the condition at block 601 or the condition at block 705 described herein is satisfied.

At block 603, the SSD module identifies a source superblock and target superblocks. The SSD module may consider various combinations of factors to select the source and target superblocks, including the following such factors, as nonexhaustive examples: free page count, valid page count, invalid page count, last modification time, wear count, the data type of data stored in a superblock (e.g., metadata versus user versus raw), or any other information about superblocks (or their constituent pages, including page status or DIF header information), such as the other information shown in the superblock table, other management data structures, or information obtained from the controller or file system. In some embodiments the SSD module selects (1) the superblock having the highest number of invalid pages for the source superblock, and (2) a superblock from the over-provisioning pool that stores the same type of data as the source superblock for the target superblock. In some embodiments, the SSD module selects two or more target superblocks, e.g., if a first selected target superblock has an insufficient number of free pages to accommodate all of the valid pages in the source superblock.

From block 603, the process proceeds in two parallel branches, the first branch beginning at block 605, the other beginning at block 640. In the first branch, starting at block 605, the SSD module copies valid source pages from the source superblock to one or more target superblocks. The branch begins with a for loop beginning at block 605, where the SSD controller repeats blocks 610 through 625 for each valid source page within the source superblock. To determine which source pages within the source superblock are valid, the SSD module may access one or more of the management data structures, such as the page status table. At block 610, the SSD module identifies the data type of the source page. The SSD module may also determine other characteristics of the source page, such as its logical write position indicator.

At block 615, the SSD module selects a new target superblock location for the source page data. The SSD module may consider any combination of factors to select the new target superblock location, including those described previously with respect to block 603, and characteristics of the particular page, such as the data type of the source page and the logical write position indicator of the source page (and adjacent pages). In some embodiments the SSD module selects a target superblock that stores the same type of data as the source page and/or that has a sufficient number of remaining free pages to accommodate all pages within the same logical write as the source page. In such embodiments, the SSD module may help ensure that similar types of data are grouped together and/or that data associated with a sequential set of FLBAs are stored in a physically contiguous manner. Once a target superblock is selected, the SSD module determines the new PLBA associated with the new target location, e.g., by utilizing the source page's data type and information in the management data structures that identifies the next sequential page available in the selected superblock.

At block 620, the SSD module instructs the SSD controller to copy data from the source page and move it to the selected target superblock, e.g., using firmware calls to move the data within the drive. When moving the data from the source page to the selected target superblock, the SSD module may instruct the controller to update the recovery data stored in the DIF region at the new target location to reflect a new timestamp and the new PLBA associated with a new target location. In the event that the move is unsuccessful, the SSD module may mark the selected location as invalid or take other corrective action, and repeat some or all of blocks 615 and 620 to move the data in the source superblock to a different location, such as to a different page in the same target superblock, or to an entirely different target superblock.

At block 625, the SSD module updates management data structures to reflect the move made at block 620. In addition to updating the management data structures described previously, the SSD module may also maintain and update a temporary remapping table to track the movement of data from one superblock to another during garbage collection. Therefore at block 625, the SSD module may add an entry to a remapping table associating the PLBA for the source page with the new PLBA determined at block 615. The SSD module may update the mapping table in order to associate the FLBA previously associated with the source page with the newly selected PLBA; alternatively it may do so later at block 655 using remapping information from a remapping table. The SSD module also updates the page status table to indicate that the newly written page is valid, to copy the logical write position information associated with the source page so it is associated with the new page, and to mark the source page as invalid. As another example, the SSD module may update the information in the superblock table associated with the target superblock and the source superblock to indicate the target location was written with valid data and the source page is now invalid. The updated information includes state, valid page count, invalid page count, next super page, next page, last modification time, and/or the page detail array.

At block 630, the SSD module determines the next valid source page. If there is another valid source page in the source superblock, the process repeats starting at block 610. Otherwise the branch proceeds to block 650, where the SSD module instructs the SSD controller to erase the source superblock.

In parallel with blocks 605-650, the garbage collection process proceeds with the second branch comprising blocks 640-648. At block 640, the SSD module updates the state of the source and target superblocks in the superblock table, e.g., to ensure that new writes are not made to the source superblock and/or target superblocks. For example the SSD module may mark the source and/or target superblocks as being subject to a garbage collection operation. Alternatively if the garbage collection is being performed as part of wear leveling as described in greater detail herein, the SSD module may mark the source and/or target superblocks as being subject to a wear leveling operation. The SSD module may also obtain a copy of a portion of the page status table, or other data management information, that reflects the status of the various pages within the source superblock before step 605 proceeds.

The second branch then proceeds to block 642, where the SSD module monitors its incoming requests and the file system to determine if pages in the source superblock have been invalidated. For example the SSD module may monitor the file system to determine whether the file system has de-allocated one or more FLBAs that correspond to one or more pages in the source superblock. At decision block 644, if invalidation is not detected the branch proceeds to block 648. Otherwise the branch proceeds to block 646, where the SSD module updates a delta data structure configured to track detected page invalidations before proceeding to block 648. For example, the SSD module may keep a delta data structure having a single bit for each page in the source superblock. When the SSD module detects the invalidation of particular page in the source superblock, the module flips the bit associated with that page. Of course the SSD module may use any other type of delta data structure.

At block 648, the SSD module determines whether the module is still moving data from the source superblock to target superblocks, as part of blocks 605 through 630. If so, the branch returns to block 642, otherwise the branch proceeds to block 655.

At block 655, the SSD module updates management data structures to reflect the erasure of the source superblock, the state of the source and target superblocks, and detected invalidations reflected in the delta data structure.

In some embodiments, to reflect the erasure, the SSD module modifies the entry in the superblock table corresponding to the source superblock as follows: (a) setting state to CLEAN, (b) zeroing out the valid page count, invalid page count, next superpage, and next page entries, (c) incrementing the wear count to reflect the erasure, (d) deleting any page detail array, (e) and updating the last modified time. In the page status table the SSD module may also mark all pages in the source superblock as having a free status. The SSD module may also remove any PLBAs from the mapping table that are still associated with the source superblock.

At block 655, the SSD module may also update the state of the target superblock to IN_USE. Also at block 655, the SSD module uses the delta data structure and the remapping table to identify those pages in the target superblock that are now invalid and updates the page status table and superblock table to reflect those invalidations.

After block 655, the garbage collection process ends. In some embodiments, the SSD controller repeats blocks 603-655 a predetermined number times, or until a particular condition is satisfied, in order to free up additional invalid pages in multiple other superblocks.

Figure 7:
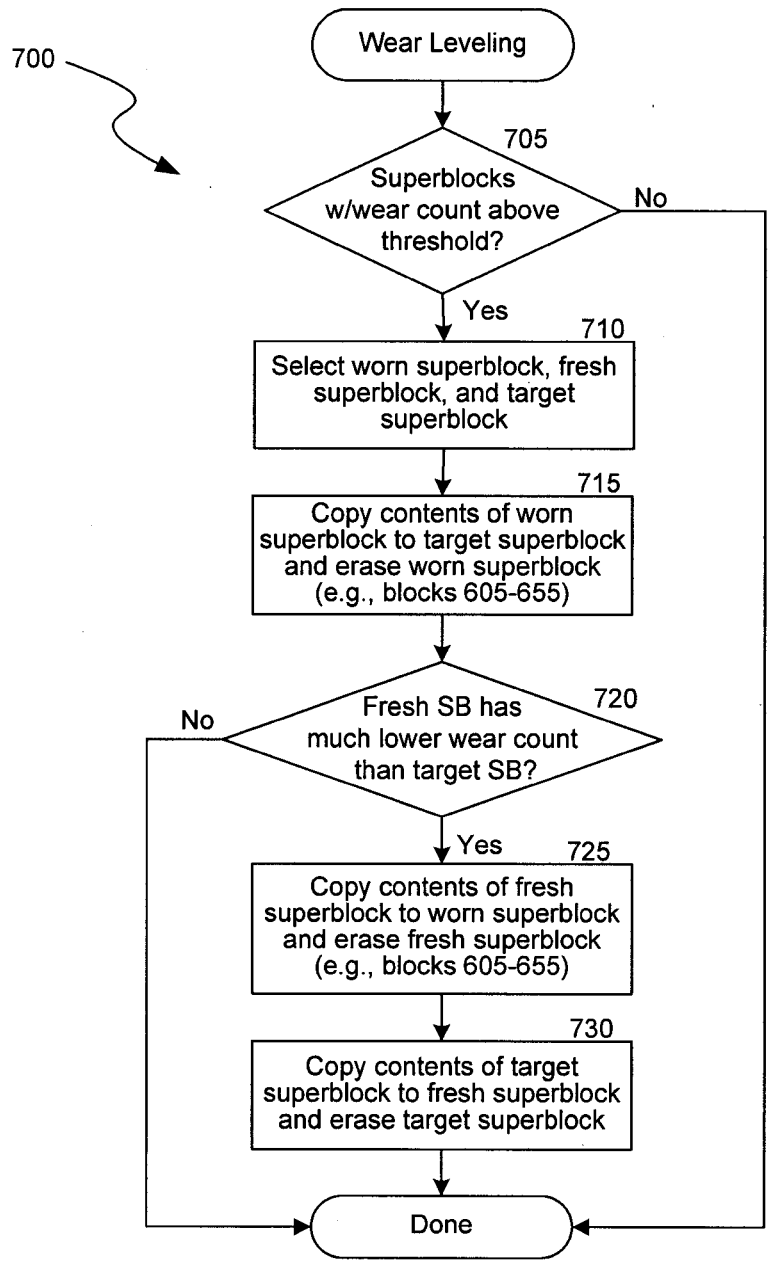
FIG. 7 is a flowchart illustrating a process for wear leveling.

FIG. 7 is a flowchart illustrating a process 700 for wear leveling. By implementing wear leveling, the SSD module may help improve the longevity of the SSD. In some embodiments, the SSD module will periodically begin the garbage collection process 600 and the wear-leveling process 700 in parallel.

The wear leveling process begins at decision block 705, where the SSD module determines whether one or more superblocks have a wear count above a predetermined threshold value, which may be mandated, for example, by a user-controlled policy. If so, the wear leveling operation continues at block 710, otherwise it ends. For example, the SSD module may determine whether any superblocks in the SSD have a wear count that exceeds 80% of a maximum wear count for which the SSD is rated. Of course the SSD module may implement wear leveling upon the occurrence of other triggers (e.g., at periodic intervals, scheduled times, etc.). In some embodiments, the SSD module will proceed with the wear-leveling process in parallel with a garbage collection process 600 if either the condition at block 705 or the condition at block 601 is satisfied.

At block 710, the SSD module selects a worn superblock, a fresh superblock, and a target superblock. The SSD module may consider any combination of factors to select the worn superblock, fresh superblock, and target superblocks including as nonexhaustive examples, free page count, valid page count, invalid page count, last modification time, wear count, the data type of data stored in a superblock (e.g., metadata versus user versus raw), or any other information about superblocks (or their constituent pages, including page status or DIF header information), such as the other information shown in the superblock table, other management data structures, or information obtained from the controller or file system.

In some embodiments, the SSD module selects the superblock having the highest wear count as the worn superblock and selects a free superblock from the over-provisioning pool as the target superblock. In some embodiments, the SSD module selects the fresh superblock on the basis of a combination of factors including wear count, type of data stored by the superblock, and the last modification time of the superblock. For example, the SSD module may select a fresh superblock having a wear count that is less than a predetermined percentage of the maximum wear count for the SSD, contains user data (which may be rewritten less frequently than metadata or raw data), and/or has a last modification time falling within a predetermined time period (e.g., is at least 10 days old).

At block 715, the SSD module copies the contents of the worn superblock to the target superblock and erases the worn superblock. In some embodiments, the copying and erasure at block 715 is performed as described in blocks 605 through 655, so that invalid pages in the worn superblock are garbage collected and the management data structures are updated to reflect the copying and erasure.

In other embodiments, the invalid pages in the worn superblock are not garbage collected at block 715. Instead, the SSD module instructs the controller to copy the contents of all pages in the worn superblock over to the target superblock (even invalid pages), erases the worn superblock and updates the data structures to reflect the movement and erasure. In such embodiments, the SSD module may update the page status table by (1) copying the page status information related to the worn superblock over to the pages related to the target superblock, and then (2) marking the pages associated with the worn superblock as free. For each FLBA that was previously mapped to an old PLBA associated with the worn superblock, the SSD module updates the PLBA entry in the mapping table (e.g., so that it includes the superblock identifier associated with the target superblock). In some embodiments, to reflect the erasure of the worn superblock, the SSD module modifies the entry in the superblock table corresponding to the worn superblock as follows: (a) setting state to CLEAN, (b) zeroing out the valid page count, invalid page count, next superpage, and next page entries, (c) incrementing the wear count to reflect the erasure, (d) deleting any page detail array, and (e) updating the last modified time.

At decision block 720, the SSD module determines whether the fresh superblock has a much lower wear count than the target superblock. For example the SSD module may determine whether the wear count of the fresh superblock is less than 90% (or another predetermined percentage) of the wear count of the target superblock. If so, the wear leveling process proceeds to block 725, otherwise the process ends. At block 725, the SSD module copies the contents of the fresh superblock to the worn superblock and erases the fresh superblock. In some embodiments, the copying and erasure at block 725 is performed as described in blocks 605 through 655, so that invalid pages in the fresh superblock are garbage collected and the management data structures are updated to reflect the copying and erasure. In other embodiments, the invalid pages in the fresh superblock are not garbage collected at block 725. Instead, the SSD module instructs the controller to copy the contents of all pages in the fresh superblock over to the worn superblock (even invalid pages), erases the fresh superblock, and updates the data structures to reflect the movement and erasure, as described previously at block 715.

The wear leveling process then proceeds to block 730 where the SSD module copies the contents of the target superblock to the fresh superblock and erases the target superblock. In some embodiments in which the SSD module performs garbage collection at block 715, to improve efficiency, no further garbage collection is performed. In such embodiments, at block 730, the SSD module simply instructs the controller to copy the contents of all pages in the target superblock over to the fresh superblock, erases the target superblock and updates the data structures to reflect the movement and erasure, e.g., as described previously at block 715. In some embodiments, including embodiments where the SSD module did not perform garbage collection at block 715, the SSD module may perform the copying and erasure as described in blocks 605 through 655, so that invalid pages in the target superblock are garbage collected and the management data structures are updated to reflect the copying and erasure. After block 730, the wear leveling process ends. In some embodiments, the SSD controller repeats blocks 705-730 a predetermined number times, or until a particular condition is satisfied, in order to promote additional wear leveling across multiple other superblocks.

Recovery of Management Data Structures

Figure 8:
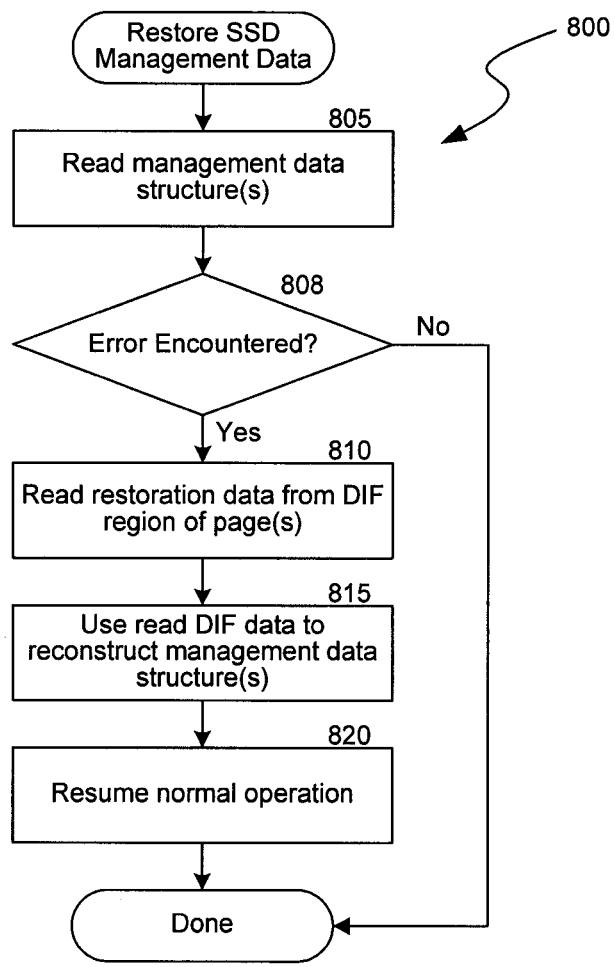
FIG. 8 is a flowchart illustrating a process for restoring SSD management data.

FIG. 8 is a flowchart illustrating a process 800 for restoring SSD management data. The restoration process begins at block 805 where the SSD module attempts to read a portion of a management data structure (or multiple management data structures), such as a mapping table, page status table, or superblock table, from an SSD. At decision block 808 the SSD module determines whether or not it has encountered a read error during its attempt. For example, the SSD module may determine that it has received corrupted data from the SSD. If the SSD module has not encountered an error, the restoration process ends. Otherwise at block 810, the SSD module reads restoration data from the DIF header region of one or more pages in the SSD. Next at block 815, the SSD module uses the DIF data to reconstruct some or all of the unreadable portion of the management data structure(s). As described previously, during a write operation the SSD module generally writes an I/O timestamp, a logical write position indicator, a PLBA and an FLBA to the DIF header region of each written page. Therefore, at block 815, the SSD module can verify that each PLBA/FLBA combination encountered in the DIF header regions of valid pages are reflected in the mapping table, as described in greater detail herein. Also, the SSD module can use the I/O timestamp to differentiate between invalid and valid pages, as described in greater detail herein in order to populate the page status table. Moreover, the SSD module can use the logical write position indicator to reconstruct the logical write position information in the page status table. Next, at block 820, once the portion of the data management structure has been restored, the SSD module resumes normal operation. The restoration process then ends.

As a first example, if the SSD module is able to read the entire page status table, but is unable to read a portion of the mapping table, the module may read the DIF header region of all or some of the valid pages in the SSD until the module has reconstructed the missing portion of the mapping table. As described previously, during a write operation the SSD module generally writes both a PLBA and FLBA to the DIF header region. Therefore, during the restore process above, the SSD module can traverse only the valid pages and verify that each PLBA/FLBA combination it encounters in the DIF header regions of the pages is reflected in the mapping table.

As a second example, if the SSD module is unable to read both a portion of the page status table and a portion of the mapping table, the module may read the DIF header region of all or some of the pages in the drive (including valid, invalid and free pages) until it has reconstructed some or all of the missing portions of the page status table and mapping table. The reconstruction proceeds similarly to that described in the first example. However, since the SSD module may not have information from the page status table indicating which pages are valid versus invalid, in this second example, the SSD module now traverses both valid and invalid pages. Therefore, during its traversal, the SSD module may encounter a particular FLBA multiple times, for example, if the same FLBA was overwritten one or more times by rewrite operations. The SSD module will resolve multiple PLBAs associated with a single FLBA by selecting, for each unique FLBA encountered, the newest PLBA that is stored in conjunction with the most recent I/O timestamp in a DIF header region. The module will then store the newest PLBA in conjunction with the FLBA in the mapping table. In the page status table, the SSD module will mark the page associated with the most recent PLBA as valid and the pages associated with the other, earlier PLBAs as invalid. The module may also determine logical write position information for a page by reading the information from the DIF header region of the page.

In the second example, the data structures may not be fully restored to their original condition, but may be sufficiently restored to permit the SSD module to perform basic data management tasks normally. For example, during restoration, some pages that contain stale data may be incorrectly marked valid in the page status table. Since the SSD module evaluates the age of various timestamps to determine the validity or invalidity of a page, the SSD module will be unable to detect when a page was previously marked invalid during a deletion operation. However, since the overlying file system has de-allocated the FLBA that was previously associated with the deleted page, the SSD module should not receive a read request for the data stored in the deleted page. Moreover, when the file system does re-allocate that FLBA, the SSD module will then mark the deleted page as invalid, because to the SSD module, it will appear to be a rewrite operation. Therefore, although the SSD module may be temporarily unaware of a small number of deleted pages, it will still be able to provide basic data management operations including accurate FLBA to PLBA remapping and garbage collection of most invalid pages.

As a third example, if the SSD module is unable to read all or a portion of the page status table but the mapping table is healthy and uncorrupted, the module may recreate all or part of the page status table by using the mapping table. For example, since the mapping table typically stores PLBAs only for valid pages (not invalid pages), the SSD module may traverse the mapping table to identify each page associated with a PLBA and FLBA in the mapping table and mark those pages as valid in the page status table. The module may also determine logical write position information for some or all of the valid pages thus identified by reading the logical write position indicator from the DIF header region of the page.

Many of the columns in the superblock table provide aggregate information that can be rebuilt from the more granular information in the page status table and mapping table, with the exception of wear count information, which can be obtained by querying the SSD controller, and the last modification time, which can be estimated by analyzing the I/O timestamps stored in DIF header regions. Therefore, if some or all of the superblock table is corrupt, the SSD module can rebuild it using the page status table and mapping table if those are both available and uncorrupted. If one or both of the page status table and mapping table are also corrupted, the SSD may reconstruct those two data structures using DIF data as described previously, and then use the reconstructed data structures to rebuild the superblock table.

Of course, one having skill in the art will appreciate that other methods of data recovery may be available in addition to, or in lieu of, using DIF header data. For example, if the SSD array is configured as a RAID group, data may be recovered using RAID recovery techniques.

Computer Systems and Other Devices

Figure 9:
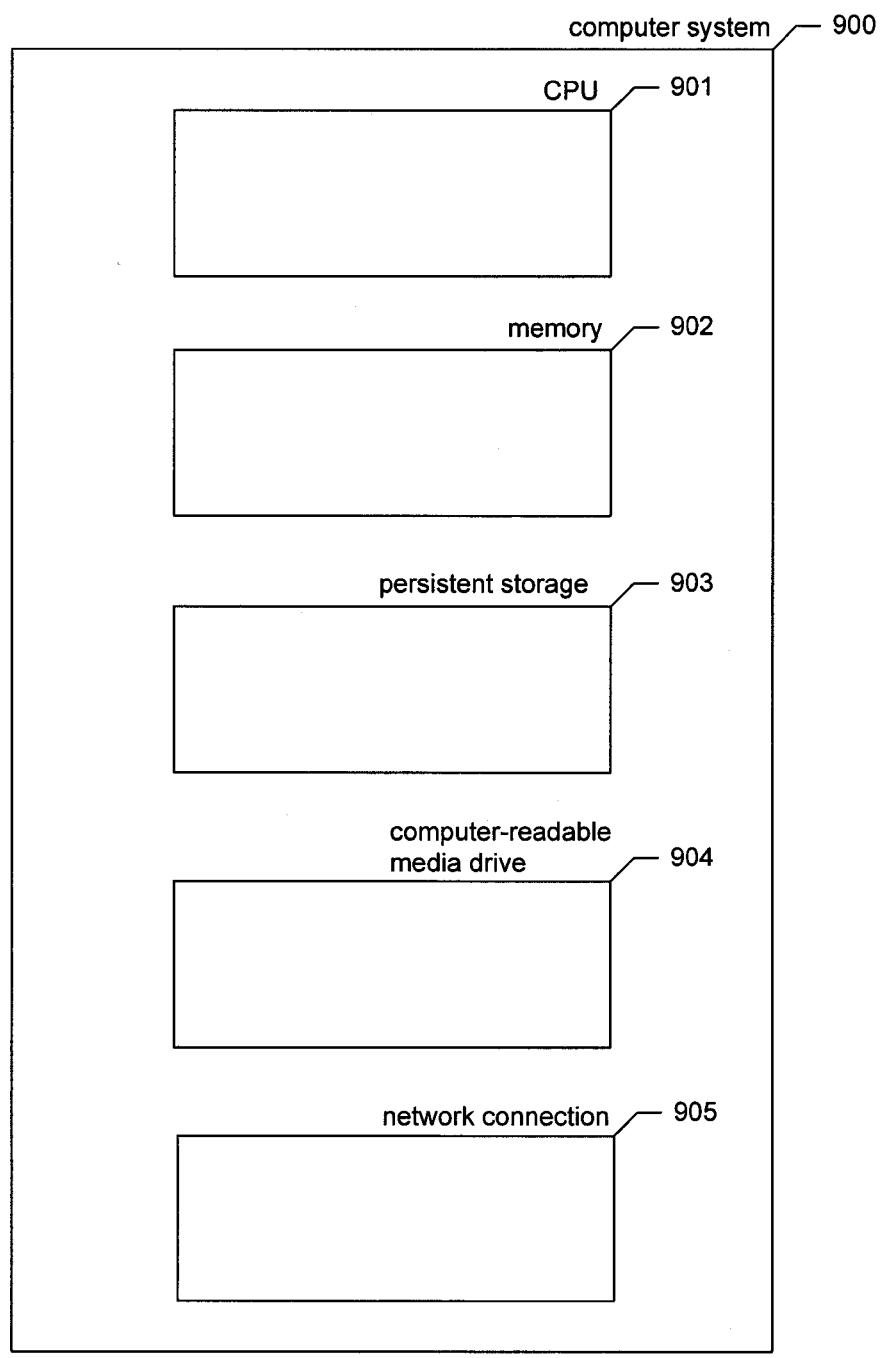
FIG. 9 is a block diagram showing some of the components typically incorporated in at least some of the computer systems and other devices on which the SSD management module executes.

FIG. 9 is a block diagram showing some of the components typically incorporated in at least some of the computer systems and other devices on which the SSD module executes. In various embodiments, these computer systems and other devices 900 can include server computer systems, desktop computer systems, laptop computer systems, tablets, netbooks, mobile phones, personal digital assistants, televisions, digital video recorders, set top boxes, cameras, automobile computers, electronic media players, etc. In various embodiments, these computer systems and devices 900 may include one or more central processing units ("CPUs") 901 for executing computer programs; a computer memory 902 for storing programs and data while they are being used, including the SSD module and associated data; a persistent storage device 903, such as a hard drive for persistently storing programs and data; a computer-readable media drive 904, such as a floppy, CD-ROM, or DVD drive, for reading programs and data stored on a computer-readable medium; and a network connection 905 for connecting the computer system to other computer systems, such as via the Internet or another data transmission network and its networking hardware, such as switches, routers, repeaters, electrical cables and optical fibers, light emitters and receivers, radio transmitters and receivers, and the like, so that data signals such as data signals conveying data structures, programs, and unstructured data may be sent between such computer systems. While computer systems configured as described above are typically used to support the operation of the SSD module, those skilled in the art will appreciate that the SSD module may be implemented using devices of various types and configurations, and having various components.

It will be appreciated by those skilled in the art that the above-described system may be straightforwardly adapted or extended in various ways. For example, in some embodiments, the SSD permits erasure at a scale larger than or smaller than a superblock and some of the erasures described herein are performed at a scale different than a superblock. As another example, in some embodiments, the SSD permits programming at a scale larger than or smaller than a page and some of the programming operations described herein are performed at a scale different than a page. As yet another example, while various processes (e.g., rewrite operations, garbage collection, and wear leveling) have primarily been described as copying data from one location in a first SSD to the same, first SSD, of course, the various processes could instead copy data from one location in a first SSD to a different, second SSD that is also managed by the same SSD module. In this way, the SSD module may achieve system-level advantages, such as system-level garbage collection and system-level wear-leveling. While the foregoing description makes reference to particular embodiments, the scope of the invention is defined solely by the claims that follow and the elements recited therein.

We claim:

1. A storage system comprising:
solid-state memory configured to store data persistently;
a controller, coupled to the solid-state memory, that is configured to execute firmware in order to read, program, and erase physical portions of the solid-state memory, the controller associating each different physical portion of the solid-state memory with a different physical logical block address (PLBA); and
a management module configured to:
receive a first input-output request generated by a file system, the file system organizing units of user data and metadata by associating each unit of user data or metadata in the file system with a file system logical block address (FLBA), the first request including an indication of an FLBA associated with a particular unit of data that is a subject of the first request;
translate the indicated FLBA into a PLBA associated with a particular physical portion of the solid-state memory; and
transmit a second input-output request to the controller via a device driver, the second request including an indication of the PLBA in order to indicate which physical portion of the solid-state memory the controller should read, program, or erase in order to fulfill the first request.

2. The system of claim 1, wherein the first request includes an indication of a data type of the particular unit of data that is a subject of the first request and the management module translates the included FLBA into the PLBA based at least in part on the indicated data type.

3. The system of claim 2, wherein the indication of a data type of the particular unit of data indicates whether the unit of data is metadata, user data, or raw data.

4. The system of claim 1, wherein the controller and firmware do not include garbage collection logic or wear leveling logic.

5. The system of claim 1, wherein the solid-state memory is organized into multiple superblocks, each superblock further comprises multiple superpages, each superpage further comprises multiple pages, and a PLBA comprises a combination of a superblock address, a superpage address, and a page address.

6. The system of claim 5, wherein the controller erases physical portions of the solid-state memory by erasing all data in an entire superblock, and programs a physical portion of the solid-state memory by programming all data in an entire page.

7. The system of claim 5, wherein at least some pages in the solid-state memory each comprise:
a storage space region that stores user data, metadata, or raw data; and
a data integrity field header region that stores restoration data useable to permit the management module to reconstruct at least portions of management data structures used by the management module.

8. The system of claim 7, wherein the restoration data comprises a PLBA, an FLBA, and an indicator of a time when the first input-output request was received.

9. The system of claim 1, wherein the file system is a ZFS file system.

10. The system of claim 1, wherein the solid-state memory is NAND flash memory.

11. The system of claim 1, wherein the solid-state memory is one of the following: flash memory, magnetoresistive random access memory (MRAM), phase-change memory (i.e., PCM, PRAM, PCRAM, Ovonic Unified Memory, Chalcogenide RAM, or C-RAM), ferroelectric random access memory (FeRAM or FRAM), conductive-bridging RAM or programmable metallization cell memory, Silicon-Oxide-Nitride-Oxide-Silicon (SONOS) memory, resistive random access memory (RRAM), Racetrack Memory, Nano-RAM (NRAM), Millipede memory, dynamic random access memory (DRAM), static random access memory (SRAM), thyristor random access memory (T-RAM), zero capacitor random access memory (Z-RAM), or twin transistor random access memory (TTRAM).

12. The system of claim 1, further comprising one or more additional solid-state memories, wherein the management module is configured to perform data management operations for all of the multiple solid-state memories in the system.

13. A method for performing a write operation to a solid-state drive (SSD) having solid-state memory, the method comprising the steps of:
receiving a request from a file system to perform an operation to write source data to an SSD, the received request including an indication of a file system logical block address (FLBA) associated with the source data in the file system and a data type of the source data;
identifying superblocks in the SSD that are available as candidate superblocks to store the source data;
selecting a candidate superblock to store at least some of the source data in order to fulfill the requested operation, the selection being based at least on the data type of the source data;
determining a physical logical block address (PLBA) associated with a target physical location within the selected superblock; and
sending, via a device driver, a write request to the SSD to write the source data at the target physical location.

14. The method of claim 13, further comprising:
determining restoration data, the restoration data including the determined PLBA, a logical write position indicator, a timestamp indicating an approximate time when the write request was received, and the indicated FLBA; and
sending the determined restoration data within the write request to the SSD, the write request indicating that the SSD should write the restoration data in a data integrity field header region at the target physical location.

15. The method of claim 13, wherein the selection of a candidate superblock is also based on at least of one the following factors:
a data type of data already stored in each candidate superblock;
a wear count of each candidate superblock;
a last modification time of each candidate superblock; and
a physical layout of the solid-state memory in the SSD.

16. The method of claim 13, wherein the selection of a candidate superblock gives preference to candidate superblocks that are currently storing data of the same data type as the source data.

17. The method of claim 13, wherein selecting a candidate superblock comprises removing from consideration any candidate superblocks that are already storing a different type of data than the data type of the source data.

18. The method of claim 13, wherein the selection of a candidate superblock gives preference to candidate superblocks having lower wear counts as compared to other candidate superblocks.

19. The method of claim 13, wherein the selection of a candidate superblock is based on a determination of which candidate superblocks offer a faster write time as compared to other superblocks.

20. The method of claim 13, wherein selecting a candidate superblock comprises removing any candidate superblocks that are being used to fulfill another in-progress or pending input-output request.

21. The method of claim 13, wherein selecting a candidate superblock comprises evaluating whether a physical layout of the solid-state memory causes some candidate superblocks to have a faster write time than other candidate superblocks.

22. The method of claim 13, further comprising updating a mapping table to associate in the table the indicated FLBA with the determined PLBA.

23. The method of claim 13, further comprising updating a page status table to indicate a relative position of a page associated with the determined PLBA within a logical write operation.

24. The method of claim 13, further comprising updating, in a superblock table, at least two of the following values that are associated with the selected superblock in the table: a superblock state, a valid page count, an invalid page count, a next superpage, next page, a stored data type, and a last modification time.

25. The method of claim 13, further comprising:
receiving a first read request from a file system to perform an operation to read data from the SSD, the received request including an indication of an FLBA associated with target data in the file system;
using the indicated FLBA as a lookup into a mapping table in order to identify a corresponding PLBA for the read request;
sending a second read request, including the identified PLBA, to the SSD via a device driver;
in response to sending the second read request, receiving a copy of the target data associated with the corresponding PLBA; and providing the copy of the target data to the file system in response to the first read request.

26. The method of claim 13, further comprising:
initiating a deletion operation associated with a particular FLBA;
calculating a PLBA associated with the particular FLBA using a mapping table;
indicating in the mapping table that the particular FLBA is no longer associated with the calculated PLBA; and
updating management data structures to reflect that a page associated with the calculated PLBA is invalid.

27. The method of claim 26, wherein the initiation is triggered by detecting a file system block release whereby the file system moves the particular FLBA to the file system's free storage pool.

28. The method of claim 26, wherein the initiation is triggered by receiving an explicit command from the file system to mark a page associated with the particular FLBA as invalid.

29. A method for restoring one or more management data structures used by a solid-state drive (SSD) management module, the method comprising the steps of:
receiving a request from a file system to perform an operation to write source data to an SSD, the received request including an indication of a file system logical block address (FLBA) associated with the source data in the file system;
selecting a superblock to store at least some of the source data in order to fulfill the requested operation;
determining a physical logical block address (PLBA) associated with a target page within the selected superblock;
determining restoration data, the restoration data including a combination of at least the determined PLBA, a logical write position indicator, a timestamp indicating an approximate time the request was received, and the indicated FLBA;
sending, via a device driver, a write request to the SSD to write the source data at a storage space region of the target page and to write the restoration data into a data integrity field header region of the target page;
encountering a read error when attempting to read a portion of a management data structure from the SSD;
reading the determined restoration data from the data integrity field header region at the target page, including reading the combination of the determined PLBA and indicated FLBA; and
analyzing the restoration data from the data integrity field header region to reconstruct at least some of the management data structure.

30. The method of claim 29, wherein analyzing the restoration data from the data integrity field header region to reconstruct at least some of the management data structure comprises determining if the combination of the determined PLBA and indicated FLBA is present in a mapping table.

31. The method of claim 29, wherein analyzing the restoration data from the data integrity field header region to reconstruct at least some of the management data structure comprises determining if the target page is valid based on an analysis of the timestamp.

32. A method for wear leveling a solid-state drive (SSD), the method comprising:
selecting a worn superblock at least on the basis of a comparison of a wear count of the worn superblock to wear counts of other superblocks;
selecting as a target superblock a free superblock from an over-provisioning pool;
selecting a fresh superblock on the basis of at least two of the following factors: a wear count of the fresh superblock, a data type of data stored in the fresh superblock, and a last modification time of the fresh superblock;
copying contents of the worn superblock to the target superblock;
erasing the worn superblock;
copying contents of the fresh superblock to the worn superblock;
erasing the fresh superblock;
copying contents of the target superblock to the fresh superblock; and
erasing the target superblock.

33. The method of claim 32, wherein selecting a fresh superblock comprises selecting a superblock that satisfies at least two of the following criteria: the superblock has a wear count that is less than a predetermined percentage of a maximum wear count for the SSD, the superblock stores user data, and the superblock has a last modification time falling within a predetermined time period.

34. The method of claim 32 wherein selecting a worn superblock is made at least on the basis of the worn superblock having a higher wear count as compared to other superblocks, and one or more of the following factors: free page count of the worn superblock, valid page count of the worn superblock, invalid page count of the worn superblock, last modification time of the worn superblock, and a data type of data stored in the worn superblock.

35. The method of claim 32 wherein selecting a worn superblock is made at least on the basis of the worn superblock having a highest wear count as compared to other superblocks.

36. The method of claim 32, further comprising:
determining whether one or more superblocks have a wear count above a predetermined threshold value; and
performing the other steps in the method when one or more superblocks have a wear count above a predetermined threshold value, otherwise not performing the other steps.

37. The method of claim 32, further comprising performing a garbage collection process.

38. The method of claim 32, wherein during at least one of the following steps garbage collection is performed so that invalid pages are not copied:
copying contents of the worn superblock to the target superblock,
copying contents of the fresh superblock to the worn superblock, and
copying the contents of the target superblock to the fresh superblock.

39. The method of claim 32, further comprising:
determining a difference between a wear count of the target superblock and a wear count of the fresh superblock;
when the difference exceeds a predetermined threshold, performing the steps of:
copying contents of the fresh superblock to the worn superblock;
erasing the fresh superblock;
copying contents of the target superblock to the fresh superblock; and
erasing the target superblock;
otherwise, when the difference does not exceed the predetermined threshold, not performing these four steps.

40. One or more computer memories collectively storing a page status data structure comprising multiple entries, each entry representing a current status of a single page of data stored in solid-state memory, each entry for a page comprising:

a logical write position indicator for the page that indicates a relative position of the page within a larger logical write operation requested by a file system, indicating whether the page was a starting page, a middle page, or an end page of the logical write operation; and a page status indicator for the page that indicates whether the page has not been programmed since it was last erased, the page contains valid data that is still in use, or the page contains invalid data that is stale;

such that the contents of the page status data structure are useable to identify an invalid page that may be reclaimed during a garbage collection operation.

41. The one or more computer memories of claim 40, wherein the page status data structure is organized as a bitmap.

42. One or more computer memories collectively storing a mapping data structure comprising multiple entries, each entry representing physical addressing information for a unit of data associated with a particular file system logical block address (FLBA) used by a file system to address the unit of data, each entry for a unit of data comprising:

a data type indicator for the unit of data that indicates whether the unit of data is a unit of metadata, user data or raw data;

a superblock address indicating a superblock that physically stores the unit of data, the superblock forming a portion of a solid-state memory;

a superpage address indicating a superpage that physically stores the unit of data, the superpage forming a portion of the superblock;

a page address indicating a page that physically stores the unit of data, the page forming a portion of the superpage; and such that the contents of the mapping data structure are useable to identify a physical location for a unit of data in response to an input-output request.

43. The one or more computer memories of claim 42, wherein the mapping data structure is organized as a hash table.

44. The one or more computer memories of claim 42, wherein each entry for a unit of data further comprises a sector address indicating a sector that physically stores the unit of data, the sector forming a portion of the page.

45. One or more computer memories collectively storing a superblock data structure comprising multiple entries, each entry representing a current status of a superblock of data stored in solid-state memory, each entry for a superblock comprising:

a wear count that indicates how many times the superblock has been erased;

a valid page count and an invalid page count that indicate how many pages within the superblock are valid and invalid, respectively;

an indication of a physical location of a next page within the superblock that is available for writing new data;

a last modification time that indicates approximately the most recent time at which any page within the superblock was invalidated or programmed; and a data type indicator that indicates whether the superblock stores metadata, user data or raw data;

such that the contents of the superblock data structure are useable to identify superblocks useable to perform a garbage collection operation, wear leveling operation, or input-output operation.

* * * * *

UNITED STATES PATENT AND TRADEMARK OFFICE
CERTIFICATE OF CORRECTION

PATENT NO.        : 8,738,846 B2
APPLICATION NO.   : 13/274277
DATED             : May 27, 2014
INVENTOR(S)       : Kyquang Son et al.

Page 1 of 1

It is certified that error appears in the above-identified patent and that said Letters Patent is hereby corrected as shown below:

In the Claims

In column 20, line 11, in claim 15, delete "of one" and insert -- one of --, therefor.

Signed and Sealed this
Ninth Day of September, 2014

Michelle K. Lee
*Deputy Director of the United States Patent and Trademark Office*